US008599245B2

(12) United States Patent
Misawa

(10) Patent No.: US 8,599,245 B2
(45) Date of Patent: Dec. 3, 2013

(54) IMAGE PROCESSING APPARATUS, CAMERA, AND IMAGE PROCESSING METHOD

(75) Inventor: Takeshi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 471 days.

(21) Appl. No.: 12/893,799

(22) Filed: Sep. 29, 2010

(65) Prior Publication Data

US 2011/0074928 A1 Mar. 31, 2011

(30) Foreign Application Priority Data

Sep. 30, 2009 (JP) .................................. 2009-228226

(51) Int. Cl.
*H04N 13/02* (2006.01)
(52) U.S. Cl.
USPC ............................................ 348/47; 348/345
(58) Field of Classification Search
USPC ................................................... 348/47, 77
See application file for complete search history.

(56) References Cited

U.S. PATENT DOCUMENTS

| 6,549,650 B1 * | 4/2003 | Ishikawa et al. ............... 382/154 |
| 7,079,669 B2 * | 7/2006 | Hashimoto et al. ........... 382/118 |
| 8,068,164 B2 * | 11/2011 | Kumagai et al. ............... 348/345 |
| 2007/0242861 A1 | 10/2007 | Misawa et al. | |
| 2008/0118156 A1 | 5/2008 | Okada | |

FOREIGN PATENT DOCUMENTS

| JP | 2007-274207 A | 10/2007 |
| JP | 2008-131405 A | 6/2008 |
| JP | 2008-252713 A | 10/2008 |

\* cited by examiner

*Primary Examiner* — Tammy Pham
*Assistant Examiner* — Marchelle L Taggart
(74) *Attorney, Agent, or Firm* — Birch, Stewart, Kolasch & Birch, LLP

(57) ABSTRACT

When multiple face frames are displayed along with multiple faces, disturbance of stereoscopic effect of an observer having stereoscopic vision is prevented and in addition, visual weariness is suppressed. A stereoscopic photographed image composed of multiple photographed images respectively captured with multiple image pickup devices is input. Positions of faces in each of the photographed images are identified. Focusing states in the positions of faces based on in-focus positions and distance information on the positions of faces. Face frames indicating the positions of faces are blurred according to the focusing states in the positions of faces. A stereoscopic display image is generated from the generated face frames and the stereoscopic photographed image.

11 Claims, 10 Drawing Sheets

IMAGE PROCESSING APPARATUS, CAMERA, AND IMAGE PROCESSING METHOD

BACKGROUND OF THE INVENTION

1. Field of the Invention

The presently disclosed subject matter relates to an image processing apparatus, a camera and an image processing method which can prevent disturbance of stereoscopic effect of an observer having stereoscopic vision and in addition allow suppression of visual weariness when a plurality of face frames detected are displayed along with a plurality of faces photographed.

2. Description of the Related Art

Three-dimensional (3D) digital cameras have been provided for users, which photograph a subject from a plurality of viewpoints to generate a stereoscopic image. The stereoscopic image is composed of, for example, two images captured from two respective viewpoints. When the two captured images are each observed by different eyes of the observer, the observer can perceive a subject image with depth feeling.

Japanese Patent Application Laid-Open No. 2008-252713 discloses a configuration which displays a plurality of face regions detected in a scene where a plurality of faces are photographed. The plurality of face regions are classified into two or more groups based on the size or the position of the face regions, and photographic control (focusing control, automatic exposure control, and auto white balancing) is performed with reference to a group specified by the user's operation from among the plurality of groups. Japanese Patent Application Laid-Open No. 2008-131405 discloses a configuration in which a color of a face frame, the type and thickness of the line of the face frame (face frame line), the transparency and the blinking state of the face frame, and the luminance or color in the inner side of the face frame are set different for each face according to the face detection state. Japanese Patent Application Laid-Open No. 2007-274207 discloses a configuration in which the contrasting density, the hue, the line-segment display percentage or the width of a face frame line are changed according to an evaluated value indicating the naturalness of the face.

SUMMARY OF THE INVENTION

When a plurality of faces at different distances from the imaging device are photographed to produce an image, an in-focus face (primary subject) in the image is clearly displayed. A face (secondary subject) which is located at a distance different from that of the primary subject and not falls into the focal depth is displayed in a blurred manner. However, face detection can also be executed for the blurred face. That is, when a face frame is displayed for all the faces detected in the image, the face frame itself is clearly displayed irrespective of whether the face is in focus or not. In displaying faces in a stereoscopic display apparatus, a face frame is displayed at the position of a face detected; in the case of a face displayed in a blurred manner, also, the face frame around the face is clearly displayed. For example, a readily viewable face frame is also clearly displayed for a face distant from the in-focus position, thus being not in-focus. That is, blurredness is different between the face and its face frame being at the same distance; thus confusion occurs in the observer, disturbing stereoscopic vision of the subject. Furthermore, the observer also tries to focus the eyes on the blurred face to clearly view the blurred face as well as the face frame; but it cannot be practically done. Consequently, weariness occurs.

In Japanese Patent Application Laid-Open No. 2008-252713, the configuration is disclosed in which an operation of classifying a plurality of face regions into groups and then specifying one group is performed by the user, so that the convenience is raised for the user. However, neither disclosure nor suggestion is given for a configuration preventing disturbance of stereoscopic effect of the observer having stereoscopic vision of a stereoscopic image and in addition allowing suppression of visual weariness. In Japanese Patent Application Laid-Open Nos. 2008-131405 and 2007-274207, the configuration is disclosed which switches face frames according to the face detection state. However, neither disclosure nor suggestion is given for a configuration which can prevent interference with stereoscopic effect for an observer stereoscopically viewing a stereoscopic image and can suppress visual weariness.

The presently disclosed subject matter has been devised in view of these circumstances. An object thereof is to provide an image processing apparatus, a camera and an image processing method which can prevent interfere stereoscopic effect for an observer stereoscopically viewing a stereoscopic image and can suppress visual weariness even when a plurality of detected frames are displayed along with a plurality of faces photographed.

To achieve the above object, the presently disclosed subject matter provides an image processing apparatus including: an image input device which receives a stereoscopic photographed image composed of a plurality of photographed images respectively captured with a plurality of image pickup devices; a face detecting device which detects faces from each of the photographed images; a face position identifying device which identifies positions of the detected faces in each of the photographed images; an in-focus position identifying device which identifies in-focus positions in each of the photographed images; a distance information acquiring device which acquires distance information on the positions of the faces based on the positions of the faces, a relative distance between the plurality of image pickup devices, and photographing directions of each of the image pickup devices; a focusing state identifying device which identifies focusing states in the positions of the faces based on the in-focus positions and the distance information on the positions of the faces; a face frame generating device which generates face frames indicating the positions of the faces, the face frames blurred according to the focusing states of the positions of the faces; and a stereoscopic display image generating device which generates a stereoscopic display image from the generated face frames and the stereoscopic photographed image.

For example, the distance information acquiring device acquires distance information on the positions of the faces based on the positions of the faces and on the length of a baseline and an angle of convergence of the plurality of image pickup devices.

That is, when a plurality of faces at different distances from the image pickup devices are photographed to display a plurality of face frames, the positions of the faces detected in each of the photographed images are identified, and the in-focus positions in each of the photographed images are identified, and distance information on the positions of the faces is acquired based on the positions of the faces, the relative distance between the plurality of image pickup devices and the photographing directions of each of the image pickup devices. And then, the focusing states in the positions of the faces are identified based on the in-focus positions and the distance information on the positions of the faces. Face frames indicating the positions of the faces, which are blurred according to the focusing states in the positions of the faces, are generated, and a stereoscopic display image is generated from the generated face frames and the stereoscopic photographed image. Thus, it is possible to prevent interference with stereoscopic effect for an observer stereoscopically viewing a stereoscopic image and can suppress visual weariness.

In addition, the focusing states are identified based on the in-focus positions and the distance information on the position of the face. Thus, it is possible to generate face frames which provide appropriate depth feeling.

According to one aspect of the presently disclosed subject matter, the focusing state identifying device identifies whether each of the positions of the faces is in focus state or out of focus state, and when it is identified that a position of a face is out of focus state, the face frame generating device changes a face frame of the face to a blurred state, compared to when the position of the face is in focus state.

According to one aspect of the presently disclosed subject matter, the focusing state identifying device identifies defocus amounts in respective positions of the faces as the focusing states, and the face frame generating device changes blurring amounts of each of the face frames according to the defocus amounts.

That is, faces in out-of-focus state and face frames blurred according to degree of blurredness of the faces are displayed. Thus, the observer stereoscopically viewing can have more naturally. In addition, the stereoscopic effect can be improved.

According to one aspect of the presently disclosed subject matter, the distance information acquiring device detects as parallax amounts of the faces, differences of the positions of the faces between the plurality of photographed images and determines distance information on the positions of the faces at least based on the parallax amounts.

That is, parallax amounts of the faces are detected from the plurality of photographed images, and the parallax amounts of the faces are used. Thus, extra hardware is not needed, and the focusing states in the positions of the faces can also be readily and quickly identified.

According to one aspect of the presently disclosed subject matter, the face frame generating device generates stereoscopic face frames indicating the positions of the faces in a manner allowing stereoscopic vision, the stereoscopic face frames blurred according to the focusing states in the positions of the faces.

According to one aspect of the presently disclosed subject matter, the image display device can further include an image display device which displays the display image.

Further, the presently disclosed subject matter provides a camera which includes the image processing apparatus.

That is, the photographer can properly perceive the face detection state by use of the face frames, and can also feel stereoscopic effect satisfactorily with visual weariness reduced.

The presently disclosed subject matter provides an image processing method including: an image input step of receiving a stereoscopic photographed image composed of a plurality of photographed images respectively captured with a plurality of image pickup devices; a face detecting step of detecting faces from each of the photographed images; a face position identifying step of identifying positions of the detected faces in each of the photographed images; an in-focus position identifying step of identifying in-focus positions in each of the photographed images; a distance information acquiring step of acquiring distance information on the positions of the faces based on the positions of the faces, a relative distance between the plurality of image pickup devices, and photographing directions of each of the image pickup devices; a focusing state identifying step of identifying focusing states in the positions of the faces based on the in-focus positions and the distance information on the positions of the faces; a face frame generating step of generating face frames indicating the positions of the faces, the face frames blurred according to the focusing states of the positions of the faces; and a stereoscopic display image generating step of generating a stereoscopic display image from the generated face frames and the stereoscopic photographed image.

According to the presently disclosed subject matter, when a plurality of face frames detected are displayed along with a plurality of faces photographed, disturbance of stereoscopic effect of an observer having stereoscopic vision is prevented, and visual weariness can also be suppressed.

DETAILED DESCRIPTION OF THE PREFERRED EMBODIMENTS

Embodiments of the presently disclosed subject matter will be described below in detail with reference to the accompanying drawings.

Figure 1:
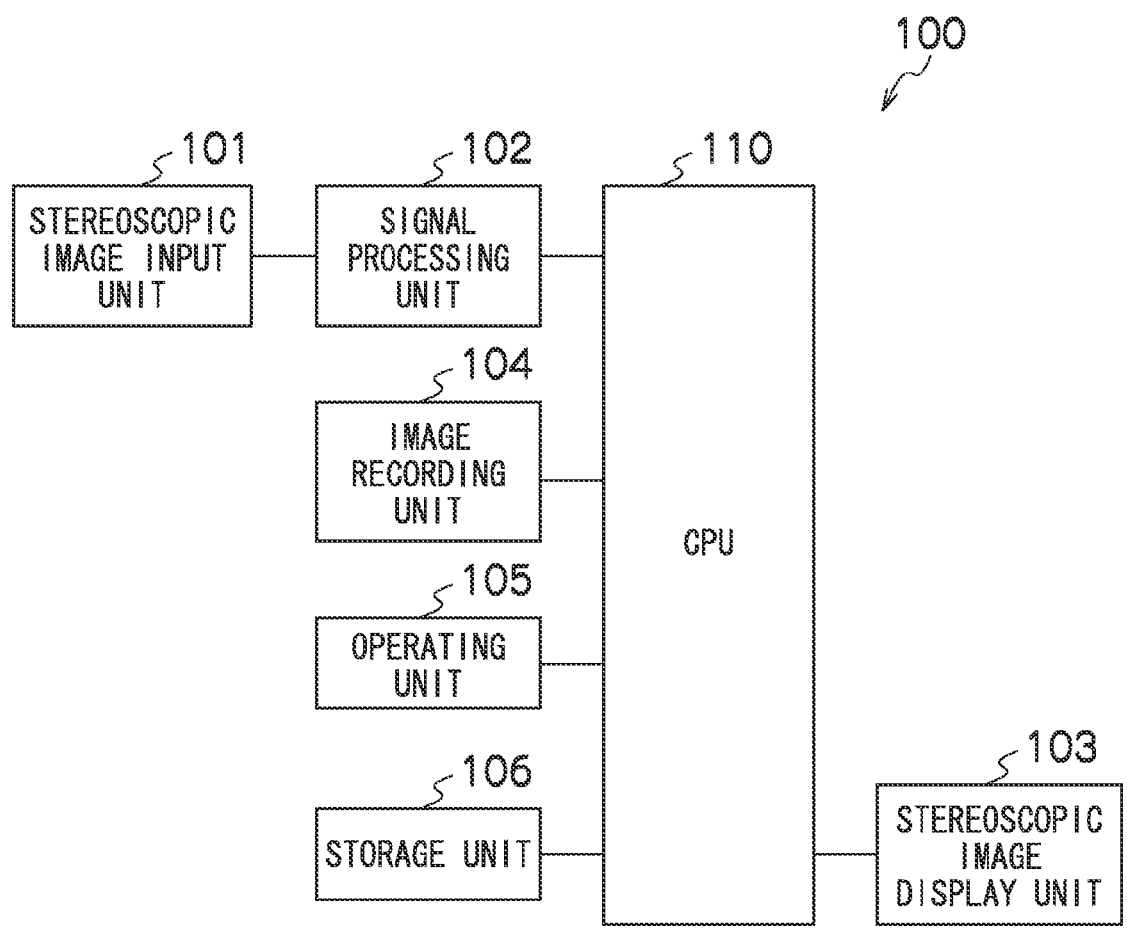
FIG. 1 is a block diagram illustrating the whole configuration of an exemplary image processing apparatus according to the presently disclosed subject matter.

FIG. 1 is a block diagram illustrating the whole configuration of an exemplary image processing apparatus according to the presently disclosed subject matter.

Referring to FIG. 1, an image processing apparatus 100 includes a stereoscopic image input unit 101, a signal processing unit 102, a stereoscopic image display unit 103, an image recording unit 104, an operating unit 105, a storage unit 106 and a CPU (Central Processing Unit) 110.

The stereoscopic image input unit 101 is an input device used to input a stereoscopic image (otherwise referred to as a "stereoscopic photographed image"). The stereoscopic image is composed of a plurality of photographed images (a plurality of planar images) obtained respectively by photographing a subject from a plurality of viewpoints. Here, the stereoscopic image is not particularly limited to a real viewpoint image obtained by practically photographing a subject from a plurality of viewpoints, but may be a virtual viewpoint image obtained by virtually photographing a subject from a plurality of virtual viewpoints, that is, an image obtained by applying an image processing to the real viewpoint image. Also, the stereoscopic image is not particularly limited to a stereoscopic image composed of a plurality of planar images, but may be a stereoscopic image composed by adding depth information to a planar image of one viewpoint generated from a plurality of planar images. The depth information indicates, for example, a parallax amount between each point (each pixel) in the image, or information corresponding to the parallax amount.

The input device constituting the stereoscopic image input unit 101 is not particularly limited to a case where a stereoscopic image is directly inputted by use of a plurality of image pickup devices each including a photographic lens and an image pickup element, but may be a recording medium interface which reads a stereoscopic image from a recording medium such as a memory card, or may be a network interface which receives a stereoscopic image via a network.

The signal processing unit 102 applies various types of signal processings to a stereoscopic image.

The stereoscopic image display unit 103 is a display device which displays a stereoscopic image in a manner allowing stereoscopic vision. A 3D (three dimensional) liquid crystal display device using light direction control system is used, for example. In the light direction control system, the direction of backlight illuminating the rear surface of the liquid crystal display device is regulated to a right-eye direction and left-eye direction of the observer. Accordingly, a left photographed image is provided to the left eye of the observer, and a right photographed image is provided to the right eye. A stereoscopic vision display device using a parallax barrier system may also be used. In the parallax barrier system, an image is given to the observer through slits vertically carved. Another type of space division system may be used. A stereoscopic vision display device provided with a lenticular lens including a group of hog-backed lenses may be used. Alternatively, stereoscopic vision may be given by making the observer wear image separation glasses. The display device is not particularly limited to the liquid crystal display devices; an organic EL display device (organic light emitting display device) may be used.

The image recording unit 104 is a device by which a stereoscopic image is recorded on a recording medium such as a memory card.

The operating unit 105 is an input device through which the user inputs a command. The operating unit 105 is constituted of key switches, for example. The operating unit 105 may include a pointing device or a touch panel sensor. The storage unit 106, including a nonvolatile memory, stores various types of information.

The CPU (Central Processing Unit) 110 controls according to programs the units of the image processing apparatus 100.

A relationship between subject distance and defocus amount (hereinafter, otherwise referred to as a "blurring amount") will be described below. In this specification, the "subject distance" is used to indicate not only a distance to an in-focus object (primary subject) but also a distance to an out-of-focus object (secondary subject).

When the distance (subject distance) from the photographic lens to the object (for example, face) is a, and the distance from the photographic lens to the image is b, and the focal distance of the photographic lens is f, then the following formula 1 is provided.

$$1/a+1/b=f \qquad \text{[Formula 1]}$$

The radius x of circle of confusion of the photographic lens is calculated using formula 1. When the aperture value of the photographic lens is F, the radius x of circle of confusion (rear blurring amount) at a light spot displaced by d from the focal point is expressed by formula 2.

$$x=df^2/2\{F(a-f)(a+d)\} \qquad \text{[Formula 2]}$$

The radius x of circle of confusion (front blurring amount) in a case of front focus is expressed by formula 3.

$$x=df^2/2\{F(a-f)(a-d)\} \qquad \text{[Formula 3]}$$

As evident from formulae 2 and 3, the blurring amount increases in proportion to the second power of focal distance f, and is inversely proportional to aperture value F, and decreases substantially in proportion to the second power of in-focus surface distance. The difference of distance from the in-focus surface is proportional to d/(a+d) in a case of rear focus, and is proportional to d/(a−d) in a case of front focus. In short, when focal distance f and aperture value F is determined, the blurring amount of each face image can be calculated based on a difference between distance (primary subject distance) to an in-focus face and distance (secondary subject distance) to an out-of-focus face.

A relationship between subject distance and parallax amount will be described with reference to FIG. 2.

Figure 2:
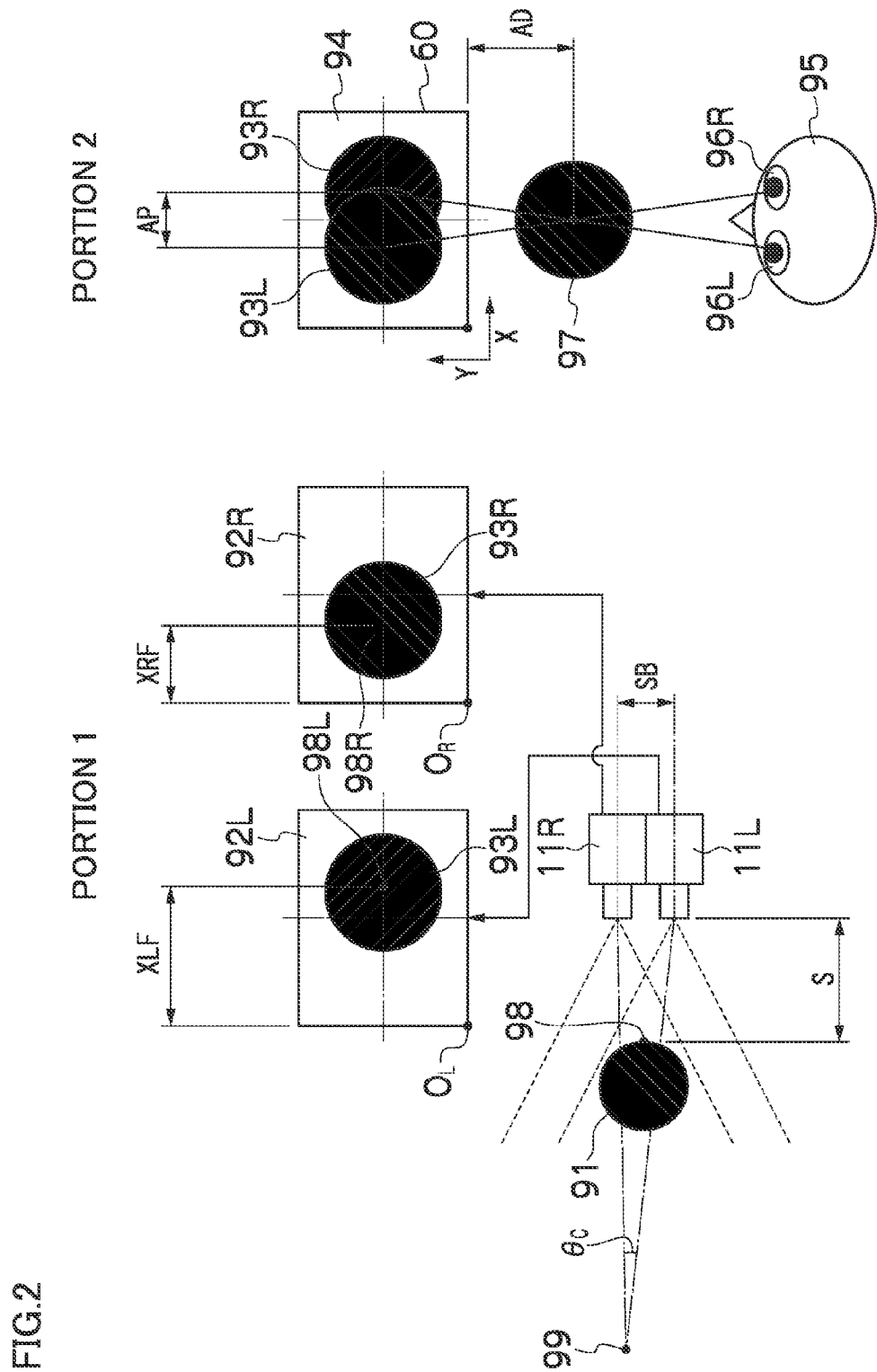
FIG. 2 is an explanatory diagram for illustrating a relationship between subject distance and parallax amount.

Referring to Portion 1 of FIG. 2, each of a left image pickup device 11L and a right image pickup device 11R includes a photographic lens having a zoom lens, focus lens and aperture, and an image pickup element such as a CCD sensor. To facilitate understanding of the invention, descriptions will be given assuming that the focal distance of the photographic lens of the image pickup devices 11L and 11R, the convergence angle θc (angle between the optical axes (photographing directions) of the image pickup devices 11L and 11R), and the baseline length SB (distance (relative distance between the image pickup devices) between the optical axes of the image pickup devices 11L and 11R)) are fixed.

When the same subject 91 (here, a ball being illustrated) is photographed from a plurality of viewpoints using the plurality of image pickup devices 11L and 11R, a plurality of planar images (left photographed image 92L and right photographed image 92R) are generated. The generated planar images 92L and 92R contain subject images 93L and 93R projected by the same subject 91, respectively. When the pair of the planar images 92L and 92R are displayed in an overlapping manner on a monitor 60 on which stereoscopic vision can be displayed, i.e., when stereoscopic vision display is made, a stereoscopic image 94 is reproduced. An observer 95 views the stereoscopic image 94 on the monitor with both eyes 96L and 96R. As a result, it seems to the observer 95 that a virtual image 97 of the subject 91 "moves to the front side." Referring to Portion 1 of FIG. 2, the subject 91 is positioned closer than a cross point 99 of the optical axes; thus, the virtual image 97 appears to move to the front side. However, when the subject is positioned more distant than the cross point 99, the virtual image 97 appears to move to the rear side.

As illustrated in Portion 2 of FIG. 2, in a range where the subject distance S is smaller than the distance to the cross point 99, as the subject distance S decreases, a difference |XLF−XRF| between center coordinates XLF and XRF of the subject images 93L and 93R on the stereoscopic image 94 becomes larger. That is, as the subject distance S decreases, corresponding pixels of the planar images 92L and 92R become more distant from each other. Here, the difference |XLF−XRF| has only the coordinates (x-axis) in a direction connecting both eyes, and this is represented by a parallax amount AP. That is, when the baseline length SB, convergence angle θc and focal distance are determined, in the case of an object point 98 closer than the cross point 99, as the subject distance S decreases, the parallax amount AP (difference of position between the pixel 98L and pixel 98R) in the stereoscopic image 94 becomes larger, and a "forward movement" amount AD of the virtual image 97 of the observer 95 becomes also larger. Though not illustrated, in the case of a subject point more distant than the cross point 99, as the subject distance S increases, the parallax amount AP becomes larger, and a "backward movement" amount of the virtual image of the observer 95 becomes also larger. Based on the positional relationship between the subject images 93L and 93R in the stereoscopic image 94, when the object point 98 of the subject 91 is closer than the cross point 99, a positive sign is affixed to the parallax amount AP; when the object point 98 of the subject 91 is more distant than the cross point 99, a negative sign is affixed to the parallax amount AP. Consequently, the subject distance S can be associated with the parallax amount AP over a range around the cross point 99.

More specifically, when the focal distance, convergence angle θc and baseline length SB of the image pickup devices 11L and 11R are determined, the subject distance S can be associated uniquely with the parallax amount AP. When any of the focal distance, convergence angle θc and baseline length SB is variable, the subject distance S may be calculated based also on the variable parameter.

Focusing state identification by a focusing state identifying unit 114 of FIG. 1 will be described.

For example, firstly, there is an aspect in which a defocus amount of face position is determined using a difference (parallax amount) between a face position (face coordinate) in the left photographed image and a face position (face coordinate) in the right photographed image. Firstly, face images are detected in the left photographed image and the right photographed image. Subsequently, the position of the detected face image in the photographed images is identified for each of the detected face images. Subsequently, the parallax amount of the face images is detected for each face image. Subsequently, distance information (for example, distance between the photographic lens and the face) on the face position is identified at least based on the parallax amount of the face image, the relative distance between the plurality of image pickup devices, and the photographing directions of the image pickup devices. Subsequently, the blurring amount (defocus amount) of an out-of-focus face image is identified based on distance information on the position (in-focus position) of an in-focus object (for example, face), on distance information on the position of the out-of-focus face, and on the focal distance and the aperture value.

The presently disclosed subject matter can also be applied to a case in which distance information on face position is determined without using a parallax amount.

Secondly, there is an aspect in which, when an in-focus position of the focus lens is searched for by a contrast system, subject distances of each face are also identified based on the position of the focus lens. Similarly to the first aspect, the blurring amount of an out-of-focus face image is identified based on distance information on an in-focus position, distance information on the position of the out-of-focus face, and the focal distance and the aperture value.

Thirdly, there is an aspect in which distance information on face position is directly acquired. For example, when a subject is photographed to acquire a photographed image, a distance image is also acquired using a distance image sensor. Similarly to the first aspect, the blurring amount of an out-of-focus face image is identified based on distance information on an in-focus position, distance information on the position of the out-of-focus face, and the focal distance and the aperture value.

Fourthly, there is an aspect in which the defocus amount of a face image is directly identified. For example, in the image pickup element, a pixel for phase difference detection is arranged along with an ordinary pixel for photography, and the defocus amount of a face image is determined based on an output signal of the pixel for phase difference detection.

The third and fourth aspects require extra hardware; on the other hand, the first and second aspects are advantageous in that extra hardware is not needed. Further, the first aspect is also advantageous in that information on the position of a face frame acquired by the ordinary face detecting processing can be used as information on face position, and thus the blurring amount of the face can be readily and quickly acquired.

Figure 3:
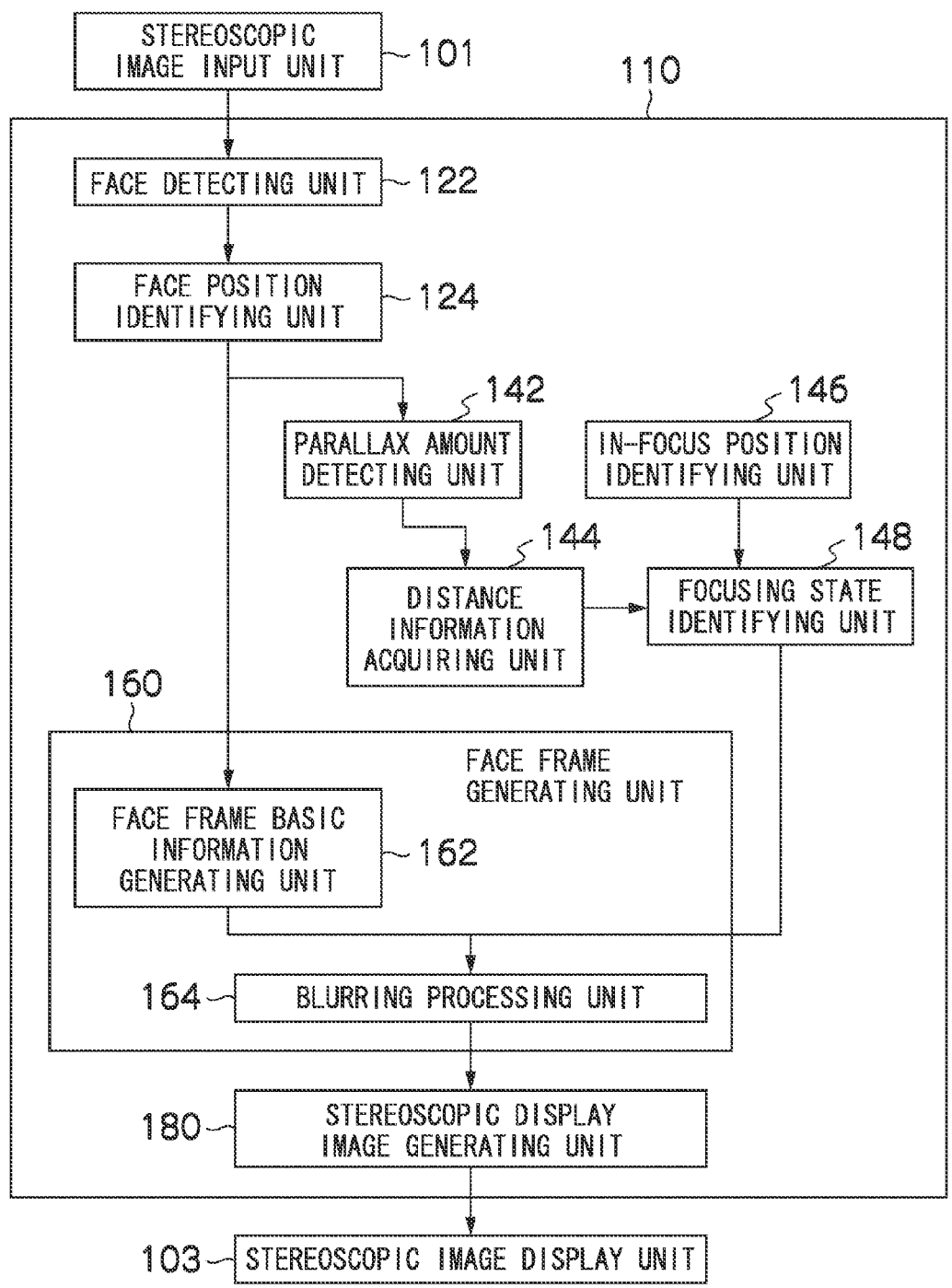
FIG. 3 is a block diagram illustrating an example of the main part of the image processing apparatus.

FIG. 3 is a block diagram illustrating an example of the main part of the image processing apparatus 100 illustrated in FIG. 1.

A CPU 110 includes a face detecting unit 122, a face position identifying unit 124, a parallax amount detecting unit 142, a distance information acquiring unit 144, an in-focus position identifying unit 146, a focusing state identifying unit 148, a face frame generating unit 160 and a stereoscopic display image generating unit 180.

The face detecting unit 122 detects a face image (the abbreviation "face" being also used below) in each photographed image constituting the stereoscopic image. The face image detection may be performed by a well-known technique, and an explanation thereof is omitted here.

The face position identifying unit 124 identifies the position of the face image detected by the face detecting unit 122 in each photographed image constituting the stereoscopic image. For example, the coordinates, height and width of the face image are identified.

The parallax amount detecting unit 142 detects a difference of the positions (parallax amount) of the face image detected by the face detecting unit 122 between respective photographed images constituting the stereoscopic image. In the case of two viewpoints, a difference of face image positions between the left photographed image and right photographed image is calculated.

The distance information acquiring unit 144 calculates a distance (distance information on face position) from the cross point (99 in Portion 1 of FIG. 2) to the face based on the parallax amount (AP in Portion 2 of FIG. 2) of a face image, the relative distance (baseline length) between the plurality of image pickup devices (11L and 11R in Portion 1 of FIG. 2), and the pickup direction (optical axis direction) of the image pickup devices. When the focal distance of the plurality of image pickup devices is variable, the subject distance is calculated based also on the focal distance.

The in-focus position identifying unit 146 identifies in-focus positions in respective photographed images constituting the stereoscopic image. For example, it is identified which face is in focus, or which object except face is in focus.

The focusing state identifying unit 148 identifies the focusing state of face position for each face detected by the face detecting unit 122, based on the in-focus position identified by the in-focus position identifying unit 146 and the distance information on face position acquired by the distance information acquiring unit 144. When an object except face is in focus, the focusing state of face position is identified based also on distance information on the position (in-focus position) of the object. For example, the radius of circle of confusion is calculated as a defocus amount of the face image.

When the focal distance and the aperture value are variable, the radius of circle of confusion is calculated based also on these variable parameters.

The face frame generating unit 160 generates, for each detected face, a face frame indicating the position of the face and blurred according to the focusing state of the position of the face. For example, a face frame is produced in a stereoscopic state, and blurred in a stereoscopic state by use of a three-dimensional filter.

The face frame generating unit 160 of this example includes a face frame basic information generating unit 162 and a blurring processing unit 164.

The face frame basic information generating unit 162 generates, for each face image, the position and size of a face frame, and face frame basic information indicating the color and shape of the face frame. The color and shape of the face frame may be different for each face image.

The blurring processing unit 164 identifies, for each face image, a blurring amount (filter coefficient) of a face frame according to the defocus amount of the face image, and applies a filtering processing to the face frame.

The stereoscopic display image generating unit 180 generates an image (otherwise referred to as a "stereoscopic display image") capable of being stereoscopically displayed on the stereoscopic image display unit 103, based on the face frame generated by the face frame generating unit 160 and the stereoscopic image inputted to the stereoscopic image input unit 101.

Figure 4:
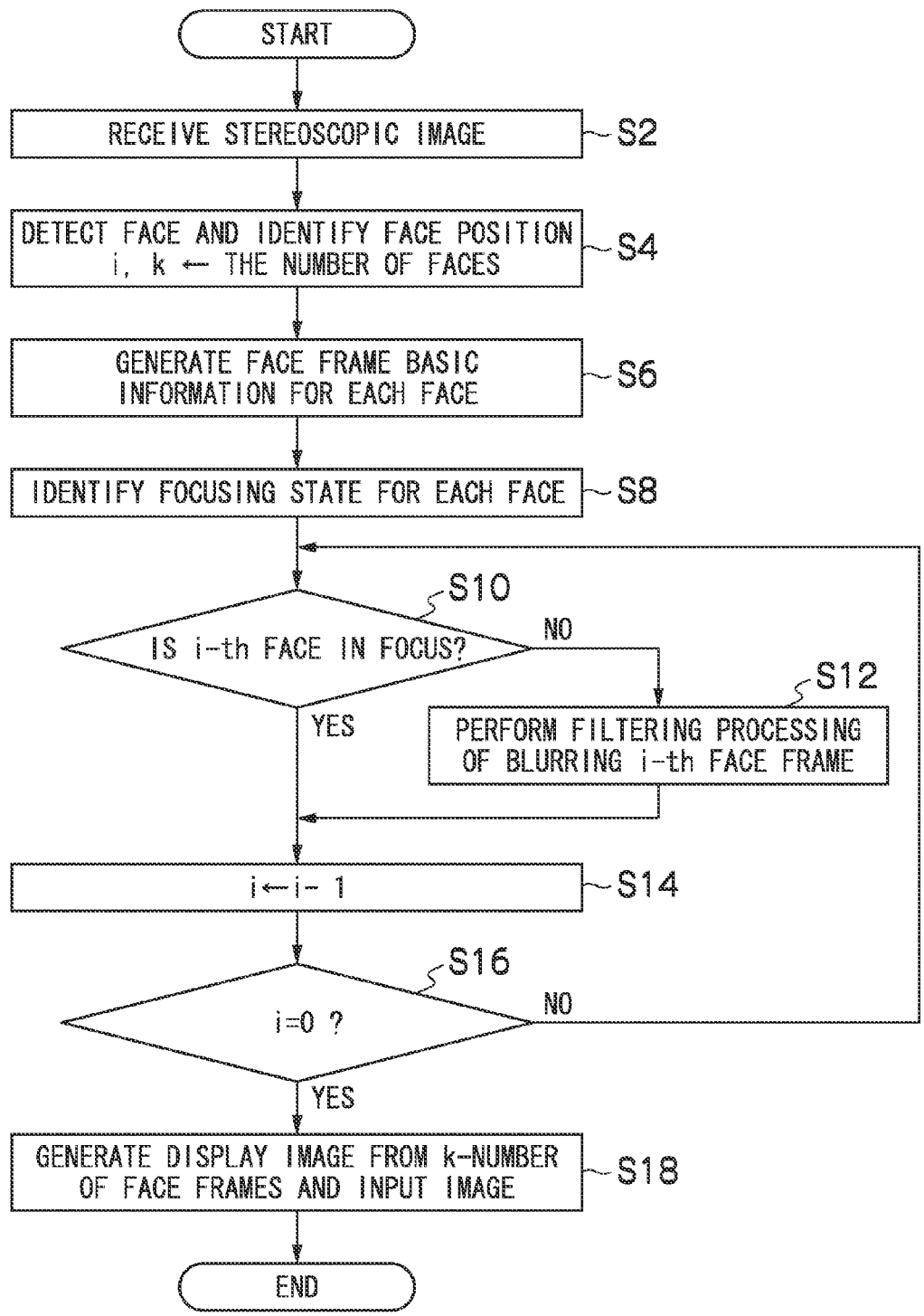
FIG. 4 is a flowchart illustrating a procedure of a first embodiment of image processing.

FIG. 4 is a flowchart illustrating a procedure of a first embodiment of image processing.

In step S2, a stereoscopic image is inputted through the stereoscopic image input unit 101. The stereoscopic image of this example is a photographed image of two viewpoints composed of a left photographed image and a right photographed image. Descriptions will be given below assuming that the stereoscopic image contains a plurality of face images (otherwise referred to simply as a "face") which are different in subject distance.

Figure 5:
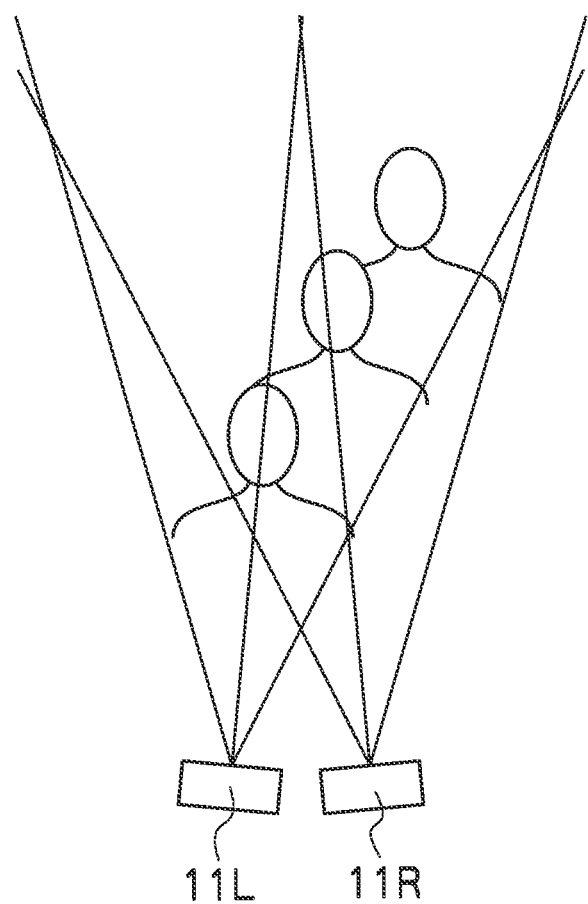
FIG. 5 is an explanatory diagram illustrating an exemplary photographing scene.

In step S4, face detection and face position identification in the stereoscopic image are performed. When a plurality of faces are photographed, firstly, the face detecting unit 122 detects a plurality of face images in each of the left photographed image and the right photographed image. Subsequently, the face position identifying unit 124 identifies, for each detected face image, the position and size of a face image in each photographed image. For example, as illustrated in FIG. 5, when three persons are photographed by the left image pickup device 11L and the right image pickup device 11R, face images of the three persons are detected, and the coordinates and size of each face image are identified. In this example, the number of detected face images are set as variables i and k.

Figure 6:
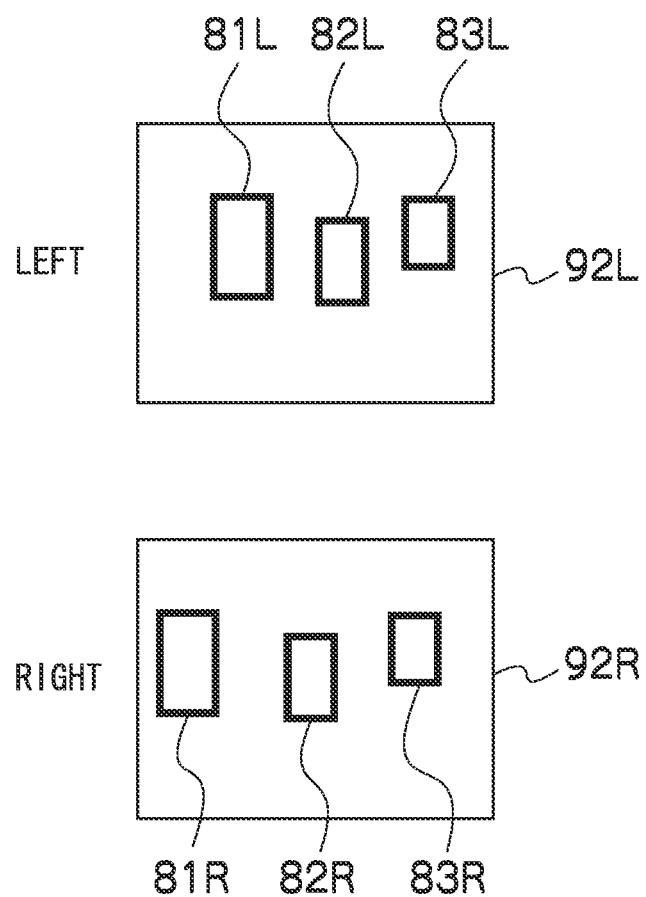
FIG. 6 is an explanatory diagram for illustrating basic information of a face frame.

In step S6, the face frame generating unit 160 generates face frame basic information for each face image. For example, face frame basic information on face frames 81L, 82L and 83L for the left photographed image illustrated in FIG. 6 and face frame basic information on face frames 81R, 82R and 83R for the right photographed image are generated. Here, the face frames of the three persons are different in position and size, but are non-blurred frames. In this step, the face frames illustrated in FIG. 6 are not practically displayed, but only the basis information for displaying the face frame is generated.

In step S8, the focusing state of a face image is identified for each face image. More specifically, a defocus amount is calculated in the following way.

Figure 7:
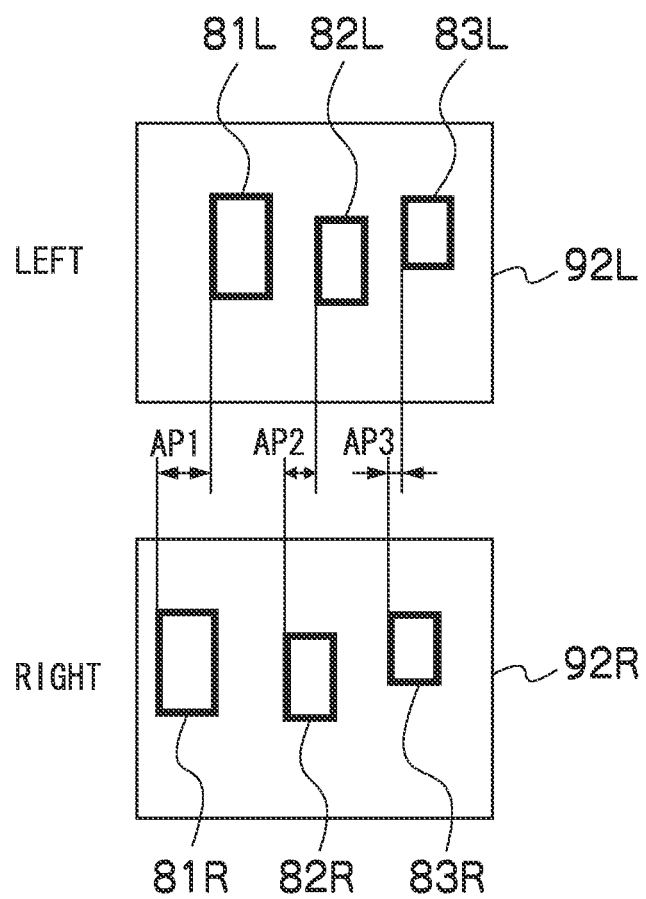
FIG. 7 is an explanatory diagram for illustrating calculation of a face parallax amount.

Firstly, the parallax amount detecting unit 142 detects, for each face image, as a parallax amount, a difference between the face image position in the left photographed image and the face image position in the right photographed image. In this example, differences AP1, AP2 and AP3 between the position of the face frames 81L, 82L and 83L in the left photographed image and the position of the face frames 81R, 82R and 83R in the right photographed image are, as illustrated in FIG. 7, calculated as the parallax amount. Here, the parallax amount is composed of: a sign indicating whether the face is closer than the cross point (99 of FIG. 2) of optical axes of the image pickup devices (11L and 11R of FIG. 2); and an absolute value corresponding to a distance from the cross point 99 to the face.

Subsequently, the distance information acquiring unit 144 calculates, for each face image, distance information on face position based on the parallax amount, the convergence angle (θc of FIG. 2) and the baseline length (SB of FIG. 2). In this example, the focal distance is fixed, but when the focal distance is variable, the subject distance is calculated based also on the variable focal distance. In this example, a distance relative to the cross point 99 is calculated as the distance information on face position, but a distance from the photographic lens to the face may be calculated.

Subsequently, the in-focus position identifying unit 146 identifies an in-focus position in each photographed image. In this example, it is identified which face is in focus. For example, a largest face in the image, a face closet to the image pickup device, or a face specified by the user is in focus.

Subsequently, the focusing state identifying unit 148 identifies for each face image, a defocus amount of the face image. For example, the radius of circle of confusion is calculated based on the in-focus position, the distance information on face position, the focal distance f and the aperture value F. When an object except face is in focus, the defocus amount of an out-of-focus face image is identified based also on the distance information on the in-focus position.

In step S10, it is determined whether an i-th face is in focus. If it is determined that the i-th face is in focus, the operation proceeds to step S14; if it is determined that the i-th face is out of focus, the operation proceeds to step S12.

In step S12, the face frame generating unit 160 performs a filtering processing of blurring the i-th face frame. For example, Gaussian filter is applied so that a point image (point pixel) in the inner side of each face frame is blurred. For example, the focusing state identifying unit 114 determines whether the radius of circle of confusion is in an allowable range. If the radius of circle of confusion is in the allowable range, it is identified that the face position is in an in-focus state; if the radius of circle of confusion is not in the allowable range, it is identified that the face position is in an out-of-focus state. Then, the face frame generating unit 160 does not apply a filtering processing to the face frame when the face position is in the in-focus state, or applies a filtering processing to the face frame when the face position is in the out-of-focus state. That is, when the face position is in the out-of-focus state, the face frame generating unit 160 changes the face frame to a more blurred state than when the face position is in the in-focus state.

In step S14, i is decremented, and in step S16, it is determined whether i is equal to zero. If i is equal to zero, i.e., when in-focus determination of all the faces has been done, the operation proceeds to step S18; if i is not equal to zero, the operation returns to step S10.

In step S18, the stereoscopic display image generating unit 180 generates a display image based on the inputted stereoscopic image and the generated face frames. In this example, each of the photographed images constituting the stereoscopic image is combined with the face frames.

Here, an example has been described in which face frames are blurred by a filtering processing. However, the following method may be used. That is, a blurred face frame is preliminarily stored in the storage unit 106, and when the defocus amount of face position is not in an allowable range, the ordinary face frame is switched to the blurred face frame.

Here, an example has been described in which distance information on face position is determined based on an inputted stereoscopic image. However, the focusing state of a face may be determined based on a tag (additional information) of an image file containing a stereoscopic image.

Figure 8:
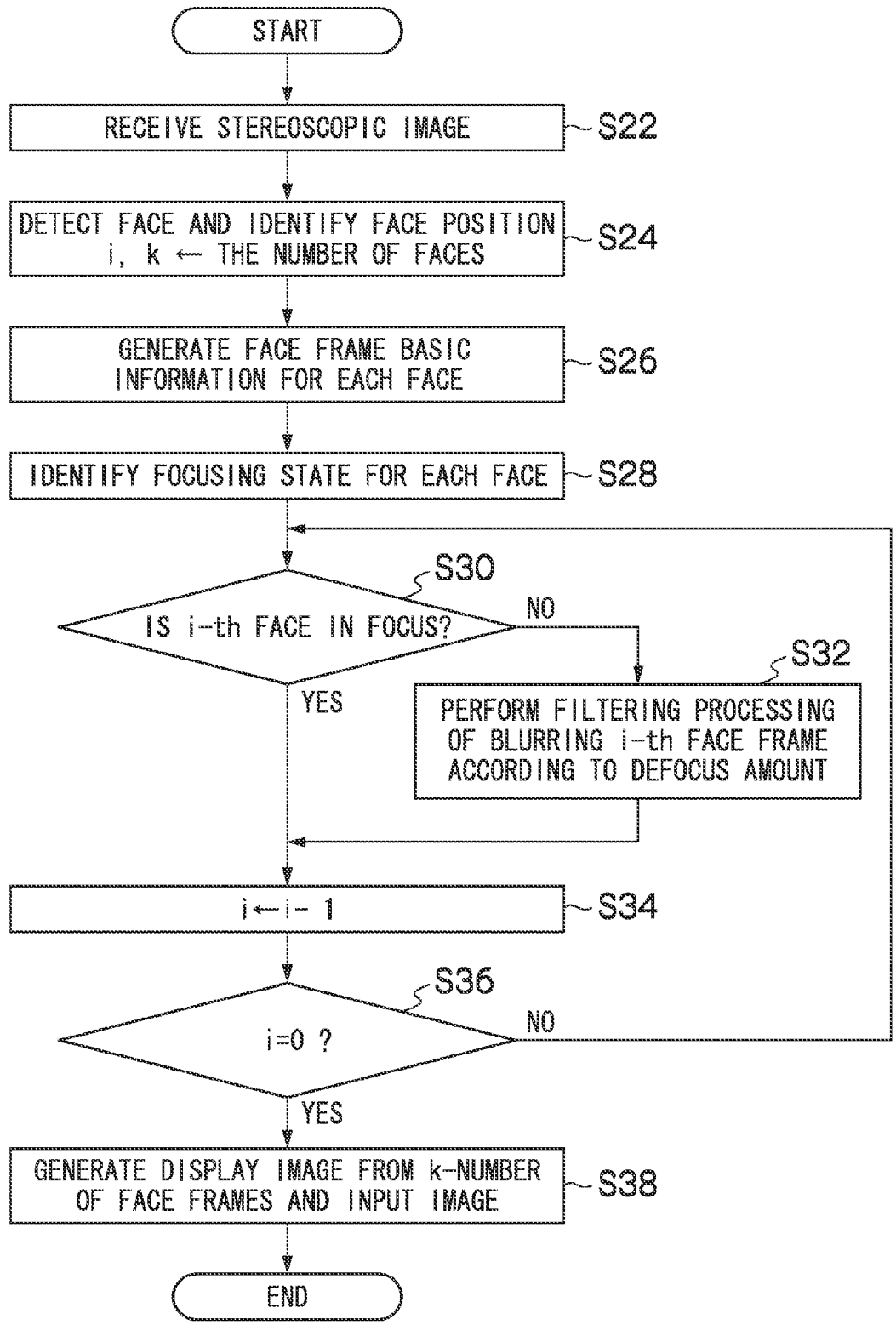
FIG. 8 is a flowchart illustrating a procedure of a second embodiment of image processing.

FIG. 8 is a flowchart illustrating a procedure of a second embodiment of image processing.

Steps S22 to S28 are similar to steps S2 to S8 of the first embodiment illustrated in FIG. 4, thus, the explanation as to steps S22 to S28 is omitted.

In step S30, it is determined whether an i-th face is in-focus. If it is determined that an i-th face is in focus, the operation proceeds to step S34; if it is determined that an i-th face is not in focus, the operation proceeds to step S32.

In step S32, the face frame generating unit 160 performs a filtering processing of blurring the i-th face according to a defocus amount. Here, filter coefficient is changed according to the defocus amount of each face image. For example, the filter coefficient having multiple levels (for example, five levels) is preliminarily stored in the storage unit 106, and the level of the filter coefficient is selected so that as the defocus amount of a face image increases, the blurring amount of the face frame becomes larger. For example, the selection is made according to the radius of circle of confusion. That is, the blurring amount of a face frame is changed according to the defocus amount of the face image.

In step S34, i is decremented, and in step S36, it is determined whether i is equal to zero. If i is equal to zero, the operation proceeds to step S38; if i is not equal to zero, the operation returns to step S30.

Step S38 is similar to step S18 of the first embodiment.

Figure 9A:
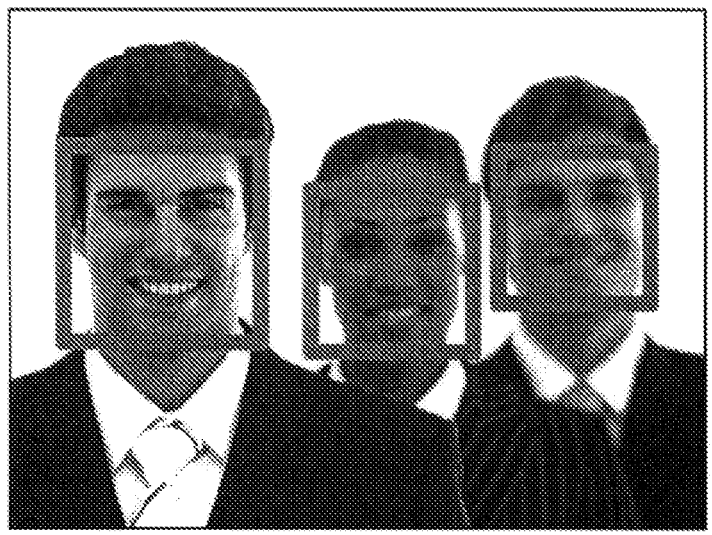
FIG. 9A is a diagram illustrating an exemplary display image when the face frame are not blurred.
Figure 9B:
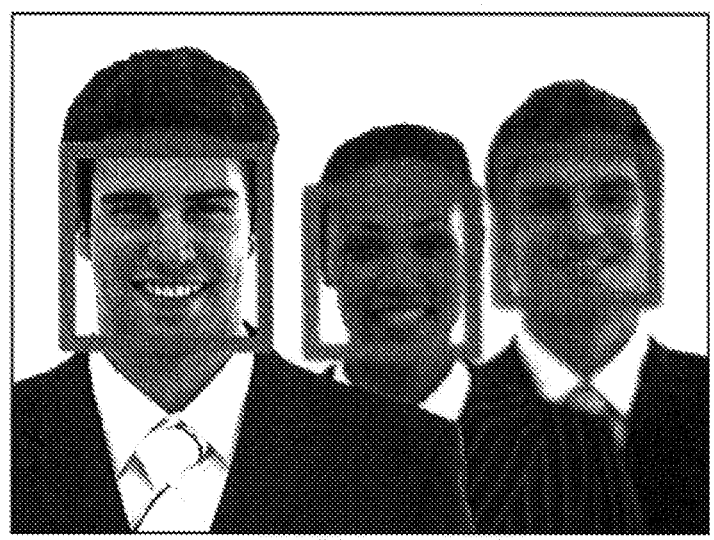
FIG. 9B is a diagram illustrating an exemplary display image when the face frame are blurred.

FIG. 9A is a diagram illustrating an exemplary display image when the face frame is not blurred, and FIG. 9B is a diagram illustrating an exemplary display image when the face frame is blurred. FIGS. 9A and B illustrate display images including three faces to which face frames are attached. Among the three faces, only one face is in-focus, and the other two are out of focus. In FIG. 9A, while two faces are displayed in a blurred manner, the face frames around the faces are clearly displayed. Consequently, the observer is more likely to perceive that a face at the in-focus position and a more distant face are at the same distance. That is, the face frames disturb stereoscopic effect. Further, the observer tries to focus the eyes on the blurred face within the clear face frame to clearly view the blurred face and thus weariness occurs. However, in FIG. 9B, while the face frame of a face at the in-focus position looks clear, the face frames of more distant faces look blurred. That is, the displaying states of face frames correspond to the focusing states of faces. Thus, the face frames do not disturb stereoscopic effect. In FIGS. 9A and 9B, an image from one viewpoint is illustrated for the convenience of explanation. However, images (stereoscopic display image) from multiple viewpoints are practically displayed in the stereoscopic image display unit 103.

Figure 10:
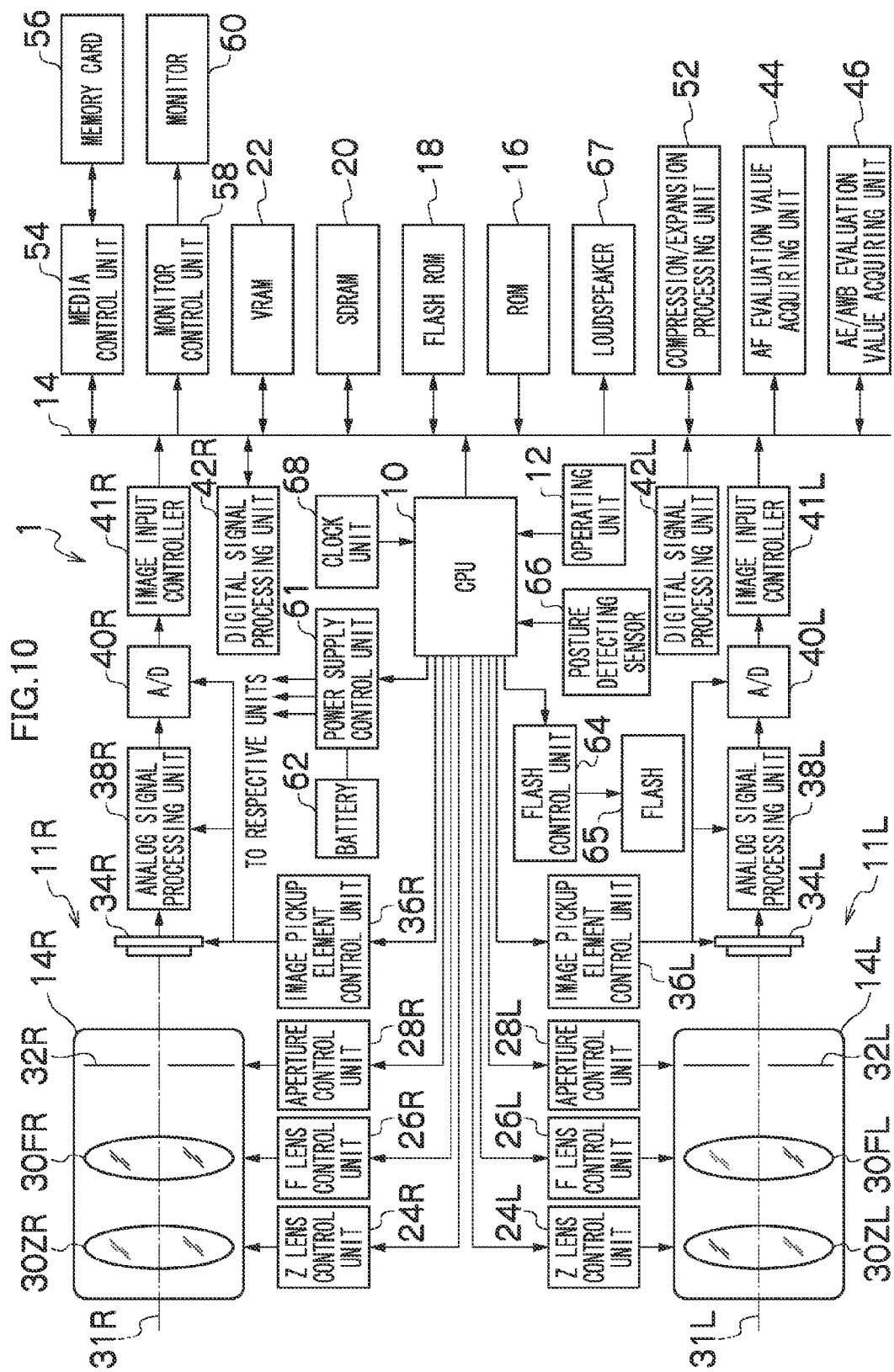
FIG. 10 is a block diagram illustrating the whole configuration of a 3D digital camera to which the presently disclosed subject matter is applied.

FIG. 10 is a block diagram illustrating the whole configuration of a 3D digital camera to which the presently disclosed subject matter is applied.

Referring to FIG. 10, a 3D digital camera 1 is a stereoscopic imaging apparatus which can photograph the same subject from a plurality of viewpoints to generate a stereoscopic image, and includes a CPU 10, an image pickup system 11 (11R, 11L), an operating unit 12, a ROM (Read Only Memory) 16, a flash ROM 18, an SDRAM (Synchronous Random Access Memory) 20, a VRAM (Video RAM) 22, a zoom lens control unit 24 (24L, 24R), a focus lens control unit 26 (26L, 26R), an aperture control unit 28 (28L, 28R), an image pickup element control unit 36 (36L, 36R), an analog signal processing unit 38 (38L, 38R), an A/D (Analog-Digital) converter 40 (40L, 40R), an image input controller 41 (41L, 41R), a digital signal processing unit 42 (42L, 42R), an AF evaluation value acquiring unit 44, an AE/AWB (Auto-Exposure/Auto-White Balance) evaluation value acquiring unit 46, a compression/expansion processing unit 52, a media control unit 54, a memory card 56, a monitor control unit 58, a monitor 60, a power supply control unit 61, a battery 62, a flash control unit 64, a flash 65, a posture detecting sensor 66, a loudspeaker 67 and a clock unit 68.

The left-eye image pickup system 11L (otherwise referred to as a "left image pickup device") mainly includes a photographic lens 14L, a zoom lens control unit 24L, a focus lens control unit 26L, an aperture control unit 28L, an image pickup element 34L, an image pickup element control unit 36L, an analog signal processing unit 38L, an A/D converter 40L, an image input controller 41L and a digital signal processing unit 42L.

The right-eye image pickup system 11R (otherwise referred to as a "right image pickup device") mainly includes a photographic lens 14R, a zoom lens control unit 24R, a focus lens control unit 26R, an aperture control unit 28R, an image pickup element 34R, an image pickup element control unit 36R, an analog signal processing unit 38R, an A/D converter 40R, an image input controller 41R and a digital signal processing unit 42R.

In this specification, an image signal obtained by photographing a subject with the image pickup system (11L, 11R) is referred to as a "photographed image." A photographed image captured by the left-eye image pickup system 11L is referred to as a "left photographed image." A photographed image captured by the right-eye image pickup system 11R is referred to as a "right photographed image."

The CPU 10 functions as a control device which performs overall control of the operations in the whole digital camera, such as imaging and reproduction, and controls based on an input from the operating unit 12, each of the units according to programs.

The operating unit 12 includes a shutter button, a power supply switch, a mode switch, a zoom button, an arrow button, a menu button, an OK button and a BACK button. The shutter button is constituted of a two-stroke switch which allows "halfway depression" and "full depression." The power supply switch is a switch for selecting ON or OFF of the power supply of the digital camera 1. The mode switch is a switch for selecting one from among different modes. The zoom button is used for a zooming operation. The arrow button can be manipulated in four directions (up, down, left and right), and is used for different setting operations along with the menu button, the OK button and the BACK button.

Programs executed by the CPU 10, and various types of data and the like needed for the control by the CPU 10 are stored in the ROM 16 connected via a bus 14. Various types of setting information and the like on the operation of the digital camera 1, such as user setting information is stored in the flash ROM 18. The SDRAM 20 is used as an arithmetic operation area of the CPU 10, and also used as a temporary storage area for image data. The VRAM 22 is used as a temporary storage area dedicated to displayed image data.

A pair (left, right) of the photographic lenses 14 L and 14R includes zoom lenses 30ZL and 30ZR, focus lenses 30FL and 30FR, and apertures 32L and 32R.

The zoom lenses 30ZR and 30LR are driven by the zoom lens control units 24R and 24L acting as a zoom lens drive device, and move longitudinally along the optical axis. The CPU 10 controls the position of the zoom lenses 30LR and 30ZR through the zoom lens control units 24L and 24R, so that a zooming operation of the photographic lenses 14L and 14R is performed.

The focus lenses 30FL and 30FR are driven by the focus lens control units 26L and 26R acting as a focus lens drive device, and move longitudinally along the optical axis. The CPU 10 controls the position of the focus lenses 30FL and 30FR through the focus lens control units 26L and 26R, so that a focusing operation of the photographic lenses 14L and 14R is performed.

The apertures 32L and 32R are constituted of an iris aperture, for example, and driven by the aperture control units 28 L and 28R acting as an aperture drive device, so that an opening amount (aperture value) is varied. The CPU 10 controls the opening amount of the aperture through the aperture control units 28 L and 28R so that the exposure amount of the image pickup elements 34L and 34R is regulated.

The image pickup elements 34L and 34R are constituted of a color CCD (Charge Coupled Device) image pickup element having predetermined color filter arrangement. The CCD has a light receiving surface on which many photodiodes are two-dimensionally arranged. An optical image (subject image) of a subject focused through the photographic lens (14L and 14R) on the light receiving surface of the CCD is converted to signal electric charges according to the amount of incident light by the photodiodes. The signal electric charges accumulated on each photodiode are sequentially read out from the image pickup elements 34L and 34R as a voltage signal (image signal) dependent on the signal electric charges, based on a drive pulse supplied from the image pickup element control units 36L and 36R in response to a command from the CPU 10. The image pickup elements 34L and 34R are provided with a function of electrical shutter; thus, the exposure time (shutter speed) is regulated by changing the electric charge accumulation time of the photodiodes. In the present embodiment, CCDs are used as the image pickup element; but an image pickup element of another structure such as a CMOS (Complementary Metal-Oxide Semiconductor) sensor may be used.

In driving the zoom lenses 30ZL and 30ZR, the focus lenses 30FL and 30FR and apertures 32L and 32R constituting the photographic lenses 14L and 14R, the CPU 10 drives the left and right photographic lenses 14L and 14R in a synchronized manner. More specifically, the left and right photographic lenses 14L and 14R are set to the same focal distance (zoom ratio) at all times; and the position of the focus lenses 30FL and 30FR is set so that the same subject is in focus at all times. Further, the aperture value and the exposure time (shutter speed) are regulated so that the same amount of exposure is provided at all times.

The analog signal processing units 38L and 38R include a correlation double sampling circuit (CD) for removing reset noises (low frequency) contained in an image signal outputted from the image pickup elements 34L and 34R, and an AGC (Automatic Gain Control) circuit for amplifying the image signal to regulate the image signal to a given level. The analog signal processing units 38R and 38L apply a correlation double sampling processing to the image signal outputted from the image pickup elements 34L and 34R, and amplify the image signal. The A/D converters 40L and 40R convert the analog image signal outputted from the analog signal processing units 38L and 38R into a digital image signal. The image input controllers 41L and 41R receive the image signal outputted from the A/D converters 40L and 40R and store the image signal in the SDRAM 20. In this example, the left photographed image and right photographed image are temporarily stored in the SDRAM 20. The digital signal processing units 42L and 42R receive according to a command from the CPU 10, the image signal stored in the SDRAM 20, and apply a predetermined signal processing to the image signal to generate image data (Y/C signal) composed of a luminance signal Y and color-difference signals Cr and Cb. The digital signal processing units 42L and 42R also apply according to a command from the CPU 10, various types of digital corrections such as offset processing, white balance adjustment processing, gamma correction processing, RGB interpolation processing, RGB/YC conversion processing, noise reduction processing, contour correction processing, color tone correction and light source type determination processing. The digital signal processing units 42L and 42R may be constituted of a hardware circuit, or the same function may be constituted of software.

The AF evaluation value acquiring unit 44 calculates an AF evaluation value (in-focus evaluation value) for detecting an in-focus position of the focus lens 30F based on the image signals (photographed images) of R, G and B written into the SDRAM 20 by one of the image input controllers 41. The AF evaluation value acquiring unit 44 of this example divides the photographed image into a plurality of detection blocks (for example, 8×8=64 blocks) and calculates an AF evaluation value for each detection block. The AF evaluation value acquiring unit 44 of this example also includes a high-pass filter allowing passage of only high frequency components of the G signal, a signal extracting unit which cuts out a signal from each detection block, and an integration unit which integrates the absolute value of signal in each detection block, and outputs the integration value of each detection block as an AF evaluation value. The AF evaluation value of this example indicates an in-focus degree in each detection block.

During AF control, the CPU 10 detects a lens position at which the AF evaluation value outputted from the AF evaluation value acquiring unit 44 has a maximum value, in the focusing area composed of the plurality of blocks. Then, the CPU 10 moves the focus lenses 30FL and 30 FR to that position, so that the focusing of the focus lenses 30FL and 30 FR is performed. For example, the CPU 10 firstly moves the focus lenses 30FL and 30 FR from close range to infinity, and sequentially acquires an AF evaluation value from the AF evaluation value acquiring unit 44 during the movement of the focus lenses 30FL and 30 FR, and detects a lens position at which the AF evaluation value has a maximum value, in the in-focus position detection area, and moves the focus lenses 30FL and 30 FR to that lens position. As a result, a subject which lies in the focus area within the field angle is in focus.

The AE/AWB evaluation value acquiring unit 46 calculates evaluation values needed for AE (automatic exposure) and AWB (automatic white balance adjustment) based on the image signals (photographed images) of R, G and B written into the SDRAM 20 by one of the image input controllers 41. The AE/AWB evaluation value acquiring unit 46 of this example divides the photographed image into a plurality of detection blocks (for example, 8×8=64 blocks) and calculates as an AE evaluation value and an AWB evaluation value, integration values of R, G and B signals for each detection block.

During AE control, the CPU 10 calculates an exposure amount based on the AE evaluation value. That is, the CPU 10 determines sensitivity, aperture value, shutter speed, necessity of flash exposure and the like. During AWB control, the CPU 10 acquires an AWB evaluation value and calculates a gain value for white balance adjustment, and in addition, detects the type of light source.

The compression/expansion processing unit 52 applies, according to a command from the CPU 10, a compression processing of a predetermined format to inputted image data to generate compressed image data. The compression/expansion processing unit 52 also applies, according to a command from the CPU 10, an expansion processing of a predetermined format to inputted compressed image data to generate non-compressed image data.

The media control unit 54 controls according to a command from the CPU 10, reading/writing of data from/into the memory card 56.

The monitor control unit 58 controls according to a command from the CPU 10, displaying on the monitor 60. The monitor 60 is used as an image display unit for displaying a captured image and also used as GUI during various types of settings. During photography, the monitor 60 sequentially displays images (through-images) continuously captured by the image pickup elements 34R and 34L, that is, the monitor 60 is used as an electrical finder.

The power supply control unit 61 controls according to a command from the CPU 10, supplying of power from the battery 62 to the above units. The flash control unit 64 controls light emitting of the flash 65 according to a command from the CPU 10. The posture detecting sensor 66 detects the posture (up/down, left/right tilt) of the body of the digital camera 1, and outputs the result to the CPU 10. More specifically, the posture detecting sensor 66 detects a tilt angle (rotational angle around the optical axis of the photographic lenses 14L and 14R) in a horizontal direction of the body of the digital camera 1 and a tilt angle (tilt angle in a vertical direction of the optical axis of the photographic lenses 14L and 14R) in a vertical direction of the body of the digital camera 1. The loudspeaker 67 outputs sound. The clock unit 68 counts the current time and data, and in addition, performs time measurement according to a command from the CPU 10.

In the 3D digital camera 1 described above, the left image pickup system 11L and the right image pickup system 11R of FIG. 10 constitute the stereoscopic image input unit 101 of FIG. 1, and the digital signal processing units 42L and 42R, and the like of FIG. 10 constitute the signal processing unit 102 of FIG. 1, and the monitor 60 of FIG. 10 constitutes the stereoscopic image display unit 103 of FIG. 1, and the media control unit 54 of FIG. 10 constitutes the image recording unit 104 of FIG. 1, and the operating unit 12 of FIG. 10 constitutes the operating unit 105 of FIG. 1, and the ROM 16, the flash ROM 18, the SDRAM 20 and the like of FIG. 10 constitute the storage unit 106 of FIG. 1, and the CPU 10 of FIG. 10 constitutes the CPU 110 of FIG. 1.

Here, descriptions have been given by taking as an example, an image containing a human face. However, needless to say, the presently disclosed subject matter may be applied to an image containing an animal face (for example, a dog or cat) except human.

Here, a case has been described in which the image processing apparatus according to the presently disclosed subject matter is used in a 3D digital camera. However, the presently disclosed subject matter may be applied to various types of image processing apparatuses which generate a stereoscopic display image containing a face frame. For example, the presently disclosed subject matter may be applied to a computer apparatus which applies a 3D editing processing to a stereoscopic image captured by a 3D digital camera.

The presently disclosed subject matter is not limited to the examples described in this specification and to the examples illustrated in the drawings. It is to be understood that various design modifications or improvements are possible without departing from the gist of the invention.

What is claimed is:

1. An image processing apparatus comprising:
   an image input device which receives a stereoscopic photographed image composed of a plurality of photographed images respectively captured with a plurality of image pickup devices;
   a face detecting device which detects faces from each of the photographed images;
   a face position identifying device which identifies positions of the detected faces in each of the photographed images;
   an in-focus position identifying device which identifies in-focus positions in each of the photographed images;
   a distance information acquiring device which acquires distance information on the positions of the faces based on the positions of the faces, a relative distance between the plurality of image pickup devices, and photographing directions of each of the image pickup devices;
   a focusing state identifying device which identifies focusing states in the positions of the faces based on the in-focus positions and the distance information on the positions of the faces;
   a face frame generating device which generates face frames, each face frame being an overlay which is generated over a corresponding face of said faces, the overlay being different from said corresponding face, the face frames indicating the positions of the faces, the face frames being blurred according to the focusing states of the positions of the faces; and
   a stereoscopic display image generating device which generates a stereoscopic display image from the generated face frames and the stereoscopic photographed image.

2. The image processing apparatus according to claim 1, wherein the distance information acquiring device acquires distance information on the positions of the faces based on the positions of the faces, and on the lengths of baseline and angles of convergence of the plurality of image pickup devices.

3. The image processing apparatus according to claim 1, wherein the focusing state identifying device identifies whether each of the positions of the faces is in focus state or out of focus state, and
   when it is identified that a position of a face is out of focus state, the face frame generating device changes a face frame of the face to a blurred state, compared to when the position of the face is in focus state.

4. The image processing apparatus according to claim 1, wherein the focusing state identifying device identifies defocus amounts in respective positions of the faces as the focusing states, and
   the face frame generating device changes blurring amounts of respective face frames according to the defocus amounts.

5. The image processing apparatus according to claim 1, wherein the distance information acquiring device detects as parallax amounts of the faces, differences of the positions of the faces between the plurality of photographed images and determines distance information on the positions of the faces at least based on the parallax amounts.

6. The image processing apparatus according to claim 1, wherein the face frame generating device generates stereoscopic face frames indicating the positions of the faces in a manner allowing stereoscopic vision, the stereoscopic face frames blurred according to the focusing states in the positions of the faces.

7. The image processing apparatus according to claim 1, further comprising an image display device which displays the display image.

8. A camera comprising an image processing apparatus according to claim 1.

9. An image processing method comprising:
- an image input step of receiving a stereoscopic photographed image composed of a plurality of photographed images respectively captured with a plurality of image pickup devices;
- a face detecting step of detecting faces from each of the photographed images;
- a face position identifying step of identifying positions of the detected faces in each of the photographed images;
- an in-focus position identifying step of identifying in-focus positions in each of the photographed images;
- a distance information acquiring step of acquiring distance information on the positions of the faces based on the positions of the faces, a relative distance between the plurality of image pickup devices, and photographing directions of each of the image pickup devices;
- a focusing state identifying step of identifying focusing states in the positions of the faces based on the in-focus positions and the distance information on the positions of the faces;
- a face frame generating step of generating face frames, each face frame being an overlay which is generated over a corresponding face of said faces, the overlay being different from said corresponding face, the face frames indicating the positions of the faces, the face frames being blurred according to the focusing states of the positions of the faces; and
- a stereoscopic display image generating step of generating a stereoscopic display image from the generated face frames and the stereoscopic photographed image.

10. The image processing apparatus according to claim 1, wherein
said face frame generating device performs a filtering processing of blurring a face frame corresponding to one of said faces, by applying a Gaussian filter so that a pixel in the inner side of said face frame is blurred,
wherein
said face frame generating device does not apply said filtering processing to a face frame when the face position is in an in-focus state, and
said face frame generating device applies said filtering processing to a face frame when the face position is in an out-of-focus state.

11. The image processing apparatus according to claim 1, wherein
a blurred face frame is stored in a storage unit, and
when a defocus amount of a face position is not in an allowable range, a face frame corresponding to said face is switched to said blurred face frame.

* * * * *